United States Patent Office 3,786,139
Patented Jan. 15, 1974

3,786,139
HYDROGEN GAS GENERATING COMPOSITION AND METHOD FOR THE SAME
Gerald L. MacKenzie, Port Tobacco, and Paul R. Mosher, Indian Head, Md., assignors to the United States of America as represented by the Secretary of the Navy
Original appplication Feb. 25, 1970, Ser. No. 17,994, now Patent No. 3,674,702. Divided and this application Apr. 26, 1972, Ser. No. 247,904
Int. Cl. C01b 1/02, 1/05
U.S. Cl. 423—657
12 Claims

ABSTRACT OF THE DISCLOSURE

Compositions of a metal hydride, such as lithium hydride, aluminum metal and an elastomer binder, such as butyl rubber, which generate hydrogen gas upon being dispersed in water.

---

This is a division of application Serial No. 17,994 filed Feb. 25, 1970, now U.S. Pat. No. 3,674,702.

BACKGROUND OF THE INVENTION

This invention relates generally to hydrogen gas generation and more particularly to a composition for generating hydrogen gas and to a method for generating hydrogen gas with such composition.

Metal hydrides, such as lithium hydride, by reaction with water, have been employed in the past to generate hydrogen gas. Such compositions and methods, however, have not been totally adequate for a number of reasons, the primary one being the difficulty in controlling the rate of gas evolution. Thus, most of these prior art compositions and methods are characterized by the rapid evolution of large quantities of gas in a short time. Such a result at times is detrimental especially since the rapid evolution of large quantities of hydrogen gas produces a significant amount of heat and at a temperature high enough to ignite the hydrogen gas. Furthermore, when the evolution of the hydrogen gas is being utilized for marking purposes prolonged periods of gas evolution are obviously more desirable.

Other problems that are specifically noted with the heretofore known hydrogen gas generating compositions are for example, (1) the lack of desirable mechanical properties, such as the lack of capability of these compositions to be readily formed into various sizes and configurations and (2) handling difficulties; for instance certain prior art lithium hydride compositions employing oil coatings in an effort to control the rate of gas evolution are especially noted for being extremely messy due to the accumulation of the oil on the operational equipment. In addition, extended storage periods also present difficulties with the prior art compositions.

SUMMARY OF THE INVENTION

Accordingly, it is one object of this invention to provide an improved hydrogen gas generator.

It is another object of this invention to provide a metal hydride containing composition and a method for generating hydrogen gas employing such a composition.

A further object of the present invention is to provide a metal hydride containing composition and a method employing such a composition which generates hydrogen gas at a controlled rate for a considerable length of time.

Still another object of the instant invention is to provide a metal hydride containing composition for use in a hydrogen gas generator which is readily formed into any desired shape and size.

A still further object of this invention is to provide a metal hydride containing composition for use as a hydrogen gas generator which is neatly and easily utilized.

Still another object of this invention is to provide a metal hydride containing composition for use as a hydrogen gas generator which is storable for long periods of time with essentially no decomposition.

These and other objects are achieved herein by providing a composition comprising a metal hydride, such as lithium hydride, in an elastomer binder, such as butyl rubber, wherein said composition generates hydrogen gas at a controlled rate by contact with water.

DESCRIPTION OF THE PREFERRED EMBODIMENTS

The hydrogen generating compositions of the present invention are comprised of a metal hydride selected from the group consisting of lithium hydride, sodium hydride, potassium hydride, aluminum hydride, calcium hydride, magnesium hydride, and lithium aluminum hydride incorporated within an elastomer binder wherein said metal hydride may be present in an amount within the range of from about 5 to about 95 percent by weight of the total composition. It is preferred, however, that the metal hydride compound be present in an amount within the range of from about 50 to about 95 percent by weight (obviously the more hydride present, the greater will be the volume of gas produced). It is further preferred that the particular metal hydride employed be in a fine particle form (such as a class 4 grade). Of course, coarser powder grades such as class 6 or chunks are also applicable. The powdered hydride forms provide for greater reactive surface areas.

Figure 2:
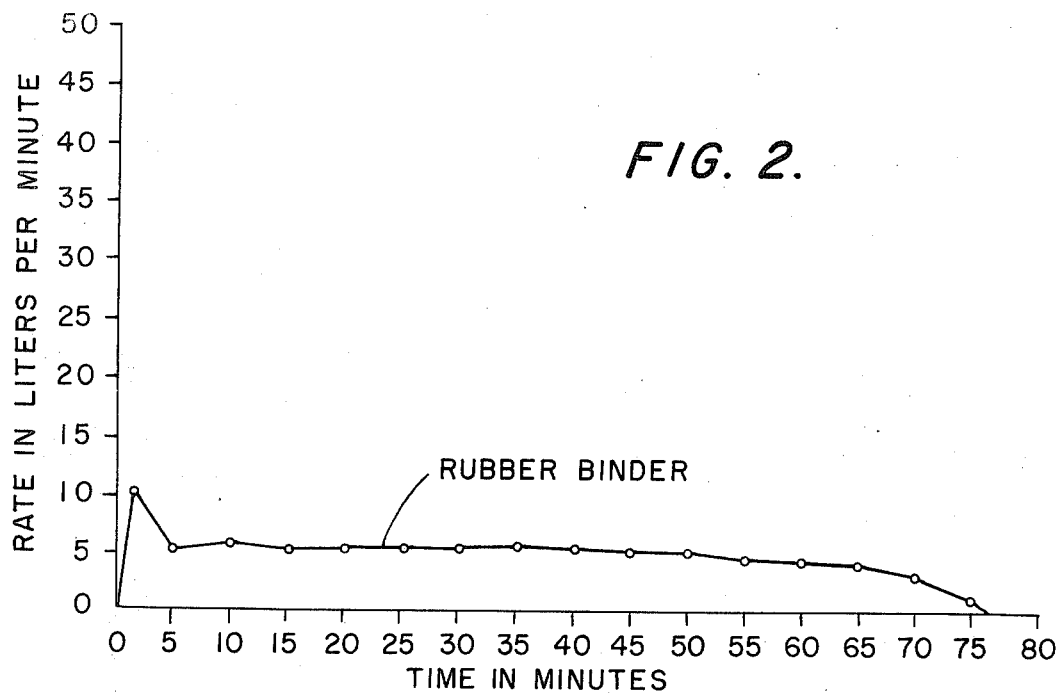

It is well known that the metal hydrides within the scope of this invention react quickly and uncontrollably with moisture and water, especially when utilized in fine particle form. However, when these same metal hydrides are incorporated in an elastomer polymeric binder selected from the group consisting of butyl rubber, polyisobutylene rubber and polyisoprene rubber, essentially no decomposition with air moisture during handling and storage is observed. Furthermore, upon contact with water, the metal hydride and rubber binder compositions of this invention generate hydrogen gas at a controlled and essentially linear rate for an extended period of time as indicated by FIG. 2 of the drawing. In addition, by adjusting the amount of binder of the compositions of this invention it is possible to either increase or decrease the rate of hydrogen gas generation. For example, a one percent decrease in the binder content may almost double the length of time for complete hydrogen gas evolution. Preferably, the butyl rubber, polyisobutylene rubber and polyisoprene rubber of this invention is of the low range unsaturation type. Furthermore, for purposes of this invention the term binder shall be defined to include the curative when such material is required and utilized such as in the case of the butyl rubber and polyisoprene. Such curatives for these rubbers are discussed below in conjunction with the procedures for the preparation of the total compositions.

The afore-described hydrogen gas generating compositions of this invention are useful for many purposes. For example, these compositions may provide a means for filling distress signal ballons at sea, a means for blowing water from ballast tanks or pontoons used to raise sunken ships, a means for marking sea areas or marker buoys to the surface by divers, a means for propelling underwater devices such as sleds and also because of the controlled linear rate of gas evolution these compositions are extremely desirable as hydrogen gas sources for fuel cells. In addition, the hydrogen gas generators of the present invention, when employed underwater also serve as decoys for submarine sonar systems and furthermore serve to simulate submarine targets in sonar testing and training operations.

However, when employed in these latter underwater capacities, i.e. as sonar decoys and submarine simulators, it has been observed that the rubber elastomer binders of this invention experience a ballooning effect which causes undesirable vertical bobings of gas generator. It has been found, quite unexpectedly, that the addition of aluminum metal to the gas generating compositions of this invention, alleviates this ballooning problem by perforating the balloon in a multitude of places. Furthermore, an added advantage of the aluminum is that it also contributes to the generation of hydrogen gas by its own reaction with water and since aluminum is quite less expensive than lithium hydride, replacing some of the lithium hydride with aluminum results in a more economical composition. Accordingly, aluminum metal may be substituted for a portion of the lithium hydride in the hydrogen gas generating compositions of this invention and thus may be present in an amount within the range of from about 0 to about 75 percent by weight; preferably, however, in the range of from about 0 to 45 percent by weight.

In lieu of the extremely reactive nature of the metal hydrides of this invention with elastomeric polymers containing functional groups such as hydroxyl, ketone, ester, or acid, such binder materials cannot be utilized for the purposes of this invention. Furthermore, in lieu of the reactive nature of these metal hydrides with moisture and in lieu of residual moisture which is contained in the operable elastomer binders of this invention, i.e. butyl rubber, polyisobutylene and polyisoprene, the compositions of this invention are produced by the processes disclosed by G. L. MacKenzie in U.S. patent application, Ser. No. 243,676, filed Dec. 19, 1962. For example, in the preparation of a lithium hydride, butyl rubber composition, the procedure employed is as follows: solid butyl rubber containing some unsaturation capable of crosslinking with sulfur is cut up into small pieces and dissolved in a hydrocarbon solvent consisting of dried hexane, cyclohexane, or petroleum ether in any proportions up to 35 percent by weight of butyl rubber and 65 percent of solvent to allow for an excess of solvent A small quantity of powdered lithium hydride, i.e. about 10 grams per 50 pounds of rubber, is then added to the butyl-solvent mixture and is allowed to react with any residual moisture, while the surface is purged with nitrogen. Upon completion of the reaction of the lithium hydride with the residual moisture, the balance of the powdered lithium hydride is added. The ingredients are thoroughly mixed and then the curatives for the butyl rubber are added. Such curatives may consist of sulfur, red lead, zinc oxide, dibenzoparaquinone dioxime and combinations thereof. After completely removing the solvent, the composition is shaped into any desired configuration (either in a die or by extrusion) and cured in an oven.

When the addition of aluminum is desired for reasons explained above, all of the aluminum metal is added anytime prior to the initial small addition of lithium hydride.

These hydrogen generating compositions of this invention may be utilized in any form which is convenient. For example, the compositions may take the shape and size of an aspirin-size tablet, or a pellet or may be used in billet form. In addition, the compositions may be coated, if desired, with a known delayed action type coating material such as the liquid polymer polyurethanes or even perhaps an additional layer of the same binder materials encompassed within the scope of this invention. Moreover, the compositions may be contacted with water in loose or supported by some type of container designed for a particular application.

The general nature of the invention having been set forth, the following examples are presented as specific illustrations thereof and also to permit a better understanding of the invention. Furthermore, it will be understood that the invention is not limited to these examples but is susceptible to various modifications that will be recognized by one of ordinary skill in the art.

EXAMPLE 1

Composition, percent by weight

| | |
|---|---|
| Lithium hydride | 90.00 |
| Butyl rubber (Enjoy 035), a product of Standard Oil Co., New Jersey | 8.31 |
| Dibenzo-p-quinone dioxane | 0.47 |
| Sulfur | 0.12 |
| Zinc oxide | 0.70 |
| Red lead oxide | 0.70 |

EXAMPLE 2

Composition, percent by weight

| | |
|---|---|
| Lithium hydride | 88.00 |
| Aluminum powder | 2.00 |
| Butyl rubber (Enjoy 035) | 8.31 |
| Dibenzo-p-quinone dioxane | 0.47 |
| Sulfur | 0.12 |
| Zinc oxide | 0.70 |
| Red lead oxide | 0.70 |

EXAMPLE 3

Composition, percent by weight

| | |
|---|---|
| Lithium hydride | 67.00 |
| Aluminum powder | 23.00 |
| Butyl rubber (Enjoy 035) | 8.31 |
| Dibenzo-p-quinone dioxane | 0.47 |
| Sulfur | 0.12 |
| Zinc oxide | 0.70 |
| Red lead oxide | 0.70 |

Figure 1:
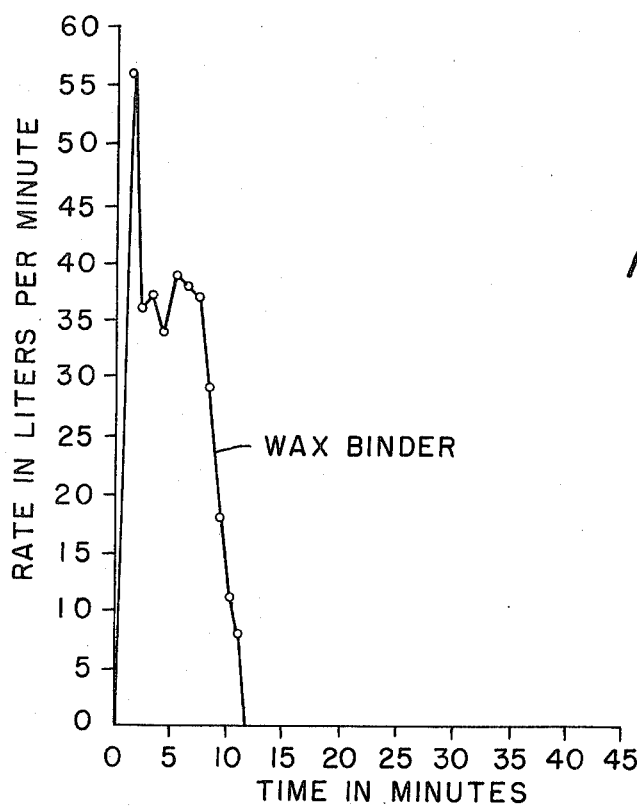
FIG. 1 is a graphical illustration of time versus gas evolution rate per unit time of a wax binder prior art hydrogen generating composition; and, FIG. 2 is a graphical illustration of time versus gas evolution rate per unit time of a rubber binder hydrogen generating composition according to this invention.

The compositions of Examples 1–3 were made according to the hereinabove described procedures. Upon continued contact with water compositions according to Example 1 generated hydrogen gas for approximately 30 to 45 minutes, while compositions according to Example 2 generated hydrogen gas for approximately 30 minutes. A graph illustrating the controlled linear gas rate evolution of the compositions of this invention (specifically the composition of Example 1 contacted with water in a tablet form) is shown by FIG. 2, while FIG. 1 illustrates the rapid, erratic and uncontrollable gas rate evolution of a similar prior art composition.

As will be evident to those skilled in the art, various modifications can be made in light of the foregoing disclosure without departing from the scope and spirit thereof.

What is claimed as new and desired to be secured by Letters Patent of the United States is:

1. The method of generating hydrogen gas which comprises contacting a composition comprising a metal hydride selected from the group consisting of lithium hydride, sodium hydride, potassium hydride, aluminum hydride, calcium hydride, magnesium hydride and lithium aluminum hydride and an elastomer binder selected from the group consisting of butyl rubber, polyisobutylene and polyisoprene with water.

2. The method of claim 1 wherein said metal hydride is present in an amount within the range of from about 5 to about 95 percent by weight of the total composition and the remainder being said elastomer binder.

3. The method of claim 1 wherein said metal hydride is present in an amount within the range of from about 50 to about 95 percent by weight of the total composition.

4. The method of claim 1 wherein said metal hydride is in a fine particle form.

5. The method of claim 1 wherein said metal hydride is lithium hydride and said elastomer binder is butyl rubber.

6. The method of claim 5 wherein said lithium hydride is present in an amount of about 90 percent by weight of the total composition and the remainder being said butyl rubber.

7. A method according to claim 1, wherein said composition also contains aluminum metal.

8. A method according to claim 7 wherein said metal hydride is present in an amount within the range of from about 5 to about 95 percent by weight of the total composition, said aluminum metal is present in an amount greater than 0 and up to about 75 percent by weight of the total composition and the remainder being said elastomer binder.

9. A method according to claim 7 wherein said metal hydride is lithium hydride and said elastomer binder is butyl rubber.

10. A method according to claim 7 wherein said metal hydride is present in an amount within the range of from about 50 to about 95 percent by weight of the total composition.

11. A method according to claim 7 wherein said metal hydride is in fine particle form.

12. A method according to claim 8 wherein said aluminum metal is present in an amount within the range of from about 2 to about 25 percent by weight of the total composition.

References Cited

UNITED STATES PATENTS

| | | | |
|---|---|---|---|
| 3,313,598 | 4/1967 | Gluckstein | 423—657 X |
| 3,346,506 | 10/1967 | Beumel, Jr. | 423—657 X |
| 3,419,361 | 12/1968 | Bratton et al. | 423—648 X |
| 3,460,906 | 8/1969 | Lenz et al. | 423—274 |
| 3,676,071 | 7/1972 | Speed | 423—648 |
| 3,674,702 | 7/1972 | MacKenzie et al. | 252—188 |

FOREIGN PATENTS 3,188    1909    Great Britain.

EDWARD STERN, Primary Examiner

U.S. Cl. X.R.

423—274, 648